G. F. KNISLEY.
EMERGENCY BRAKE.
APPLICATION FILED MAR. 3, 1917.

1,240,150.

Patented Sept. 11, 1917.
2 SHEETS—SHEET 1.

Inventor
G. F. Knisley

Witness
Hugh H. Ott

By Victor J. Evans
Attorney

G. F. KNISLEY.
EMERGENCY BRAKE.
APPLICATION FILED MAR. 3, 1917.
1,240,150.
Patented Sept. 11, 1917.
2 SHEETS—SHEET 2.
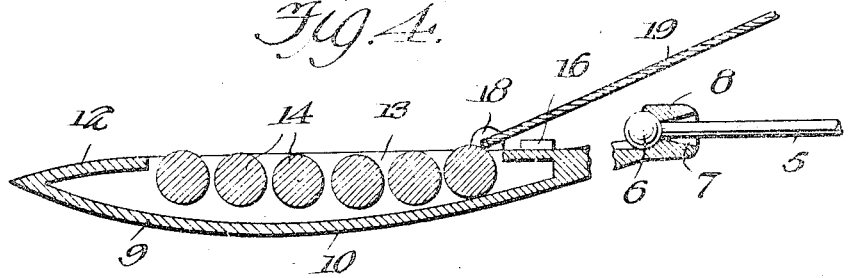
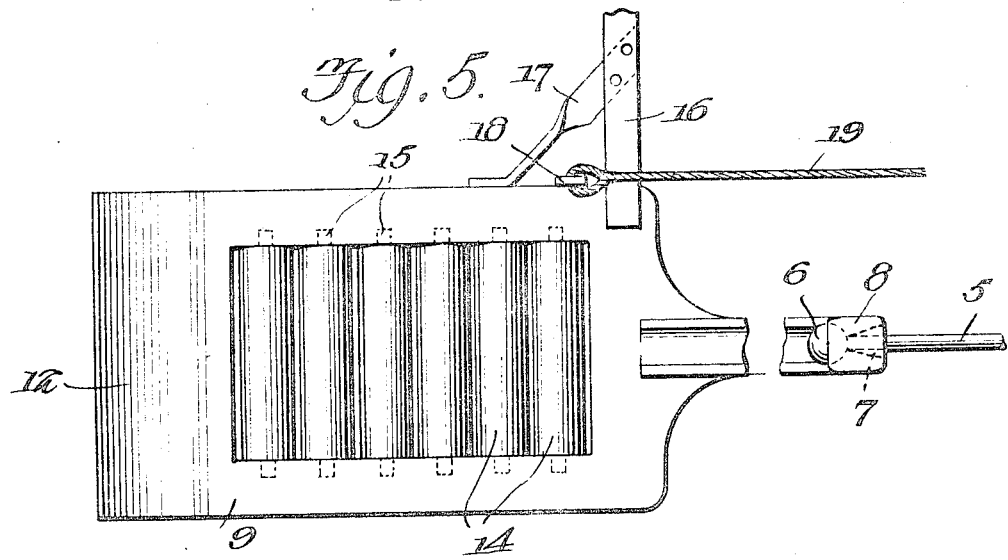

UNITED STATES PATENT OFFICE.

GEORGE F. KNISLEY, OF CHARLESTON, SOUTH CAROLINA.

EMERGENCY-BRAKE.

1,240,150.

Specification of Letters Patent. Patented Sept. 11, 1917.

Application filed March 3, 1917. Serial No. 152,322.

*To all whom it may concern:*

Be it known that I, GEORGE F. KNISLEY, a citizen of the United States, residing at Charleston, in the county of Charleston and State of South Carolina, have invented new and useful Improvements in Emergency-Brakes, of which the following is a specification.

This invention relates to improvements in wheel brakes for vehicles of various classes, but is particularly designed for use on automobiles, the object of the invention being to provide a novel construction of brake shoes and a novel construction of mounting therefor, whereby the brake shoes may be lowered and positioned on the ground so that the wheels of the vehicle will travel thereon and revolve upon the said shoes out of contact with the ground, thus halting the propulsion of the vehicle.

A further object of the invention is to provide improved means for holding the brake shoes in inactive or elevated position, said means permitting of the brake shoes to be readily dropped to wheel engaging position and easily and quickly returned to inactive or elevated position to permit of the travel of the vehicle after the application of the brakes.

It is a further object of the invention to provide a brake mechanism which may be instantly applied and released; which may be easily operated; which shall comprise few simple parts and which may be readily installed upon all classes of automobiles or other vehicles.

With the foregoing objects in view and others which shall appear as the description of the invention is proceeded with, the invention consists in the novel features, details of construction and combination of parts which will hereinafter be more fully set forth, illustrated in the accompanying drawings and pointed out in the appended claims.

In the drawings:

Figure 1 is a side elevation of an automobile having a brake mechanism constructed in accordance with the present invention and illustrating the application of the brakes, Fig. 2 is a top plan view of the same, the automobile being indicated by the dotted lines, Fig. 3 is a detail side elevation illustrating the arrangement of parts when the brakes are brought to their inactive and elevated position, Fig. 4 is an approximately central vertical longitudinal sectional view through one of the track shoes, upon an enlarged scale.

Fig. 5 is a top plan view of one of the brake shoes.

While in the accompanying drawings I have illustrated in Figs. 1 to 5, the improvement as designed for and applied to an automobile, and for which it is primarily designed, it is to be understood that my improved brake is not to be thus restricted in its useful application, as the same may be readily applied to any class of motor driven vehicles.

In the preferred embodiment of the improvement, the numeral 1 designates an automobile of any desired construction, and 2 the rear or propelling wheels therefor. Beneath the running board or at any desired point upon the sides of the vehicle 1 I secure hooks 3 which receive eyes 4 upon the ends of rods 5, the said rods extending in the direction of the rear of the propelling wheels 2. The rods 5 may, it is to be understood, be hingedly secured to the sides of the vehicle 1 in other manners than that illustrated, and the free end of each of the rods 5 is provided with a rounded head 6. The headed ends of the rods pass through flared or substantially cone-shaped openings 7 provided in a knob or lug 8 formed centrally of and arranged upon the inner and upper corners of the brake shoes 9. The shoes 9 comprise substantially rectangular members of a width greater than the cross sectional diameter of the tires of the wheels 2, and the under faces of the said brake shoes are curved or are of an arcuate formation as indicated by the numerals 10. The upper face of each of the brake shoes is horizontally straight for the major portion of the length thereof, but is rounded or inclined downwardly to its outer corner as indicated by the numeral 12. The brake shoes 9 preferably comprise hollow members, that is the upper faces of the said shoes, for a suitable distance from the knob or lug 8 and from the terminal of the rounded portion 12 is provided with a pocket 13 within which are arranged anti-frictional rollers 14, and the trunnions 15 of the said rollers are journaled in suitable bearing openings which may be provided in plates that are secured to the side walls of the pocket 13.

As disclosed in the drawings, two of the brake shoes 9 are employed, one for each of the propelling wheels 2 of the vehicle 1, and these shoes 9 are connected by a transverse bar 16 secured adjacent to the inner edges of the said shoes, to the rear of the knob or lugs 8, while angularly disposed brace members 17 are secured to the inner sides of the shoes and connected with the bar 16.

Each of the brake shoes is provided, upon its inner side with a lug 18, and to each of these lugs is secured one end of flexible elements 19.

Journaled in suitable bearings in the chassis of the vehicle is a transversely arranged shaft 20, the opposite ends of the shaft projecting beyond the side members of the chassis and upon these ends are secured spools or drums 21 around which the flexible elements 19 are wound and upon which the ends of the said flexible elements are secured. The shaft 20 projects beyond one of the drums 21 and this projecting end of the shaft is squared or non-circular in cross section whereby to receive the socket provided in the angular end of a crank 22, and by the operation of the said crank or other device provided for the purpose the shaft 20 will be revolved to wind the flexible elements 19 around the drums 21 and thus cause the shoes to travel upon the rods 5 out of free engaging position and, of course, toward the drums 21. The drums 21 are, of course, arranged a suitable distance above the shoes, and when the said drums are actuated, as just described, the brake shoes will be elevated, and the same, when drawn to their full inoperative position, will swing the rods 5 upon their hinges in an upward direction, drawing the brake shoes forward until the lugs 8 come in contact with and rest upon supports 23 which are secured to the vehicle chassis outwardly of and below the drums 21. The supports 23 are primarily in the nature of guide members for the rods 5, but, and as illustrated in Fig. 3 of the drawings, the said supports receive the knobs 8 of the brake shoes 9 when the device is brought to its inoperative position. The shoes 9, having the ends thereof resting upon the supports are arranged angularly with respect to the said supports, so that when the holding mechanism for the said shoes is released, (in a manner as will be hereinafter described,) the shoes, by virtue of the weight thereof, will gravitate to operative position, as illustrated in Figs. 1 and 2 of the drawings.

To help sustain the brake shoes in their inactive position, I provide spring pivoted hooks or dogs 24, each of which is connected by a rod 25 and the said rods are in turn connected to a pivoted foot lever 26 which passes through a suitable opening in one of the bottom boards of the vehicle body and which is arranged readily accessible to the operator of the vehicle. The dog members 24 are so arranged that the same will engage with the pointed outer ends of the shoes, and in connection with the supports 23 effectively sustain the said shoes in their elevated and inactive position. By actuating the lever in one direction, the dogs will be swung to release the brake shoes and the said shoes will travel by gravity on the inclined rods 5 in the direction of the wheels 2, permitting the said wheels to ride upwardly upon the said shoes, the said wheels being thus elevated above the ground or permitted to revolve upon the anti-frictional rollers 14 without necessity of shutting off the motor power but thus almost instantaneously bringing the vehicle to a stop. In this connection, it is to be stated that the weight of the brake shoes are at all times sufficient to unwind the flexible elements 19 from around the drums 21 and likewise, of course, to revolve the drums 20 to which the shafts are secured.

Having thus described the invention, what is claimed is:

1. In combination with a self-propelled vehicle, of rod members hingedly connected with the vehicle, heads upon the free ends of the rod member, gravitative brake shoes, each of said shoes having a knob at one of the corners thereof provided with a flared opening through which the rods pass, and whereby the slidable movement of the brake shoes upon the rods is limited in one direction, a connection between the brake shoes, flexible elements connected with the brake shoes, winding means upon the body of the vehicle for the flexible element, supports for the rods, spring dogs for engaging with the brake shoes for retaining the same in inoperative position, and operating means for the dogs.

2. In combination with an automobile or like self-propelled vehicle, of rod members hingedly secured to the sides of the body of the vehicle and directed toward the propelling wheels thereof, gravitative brake members upon each of the rods, anti-frictional elements upon the upper face of each of the brake members, a connection between the pair of brake members, a shaft journaled in bearings on the body of the vehicle, drums upon the shaft, a crank for the shaft, a flexible element connected with each of the brake shoes and wound one around each of the drums, a rigid support upon the body of the vehicle to engage with the shoes when the said shoes are elevated to an inactive position, means between the rods and brake shoes for limiting the gravitation of the said brake shoes in an outward direction with respect to the rods, whereby the said brake shoes will be positioned directly below the propelling wheels of the vehicle, dogs upon the vehicle arranged to engage with the brake shoes to retain the same in their elevated and inactive position, a pivoted pedal, and elements connecting the pedal with the dogs, as and for the purpose set forth.

In testimony whereof I affix my signature.

GEORGE F. KNISLEY.